United States Patent Office 3,093,711
Patented June 11, 1963

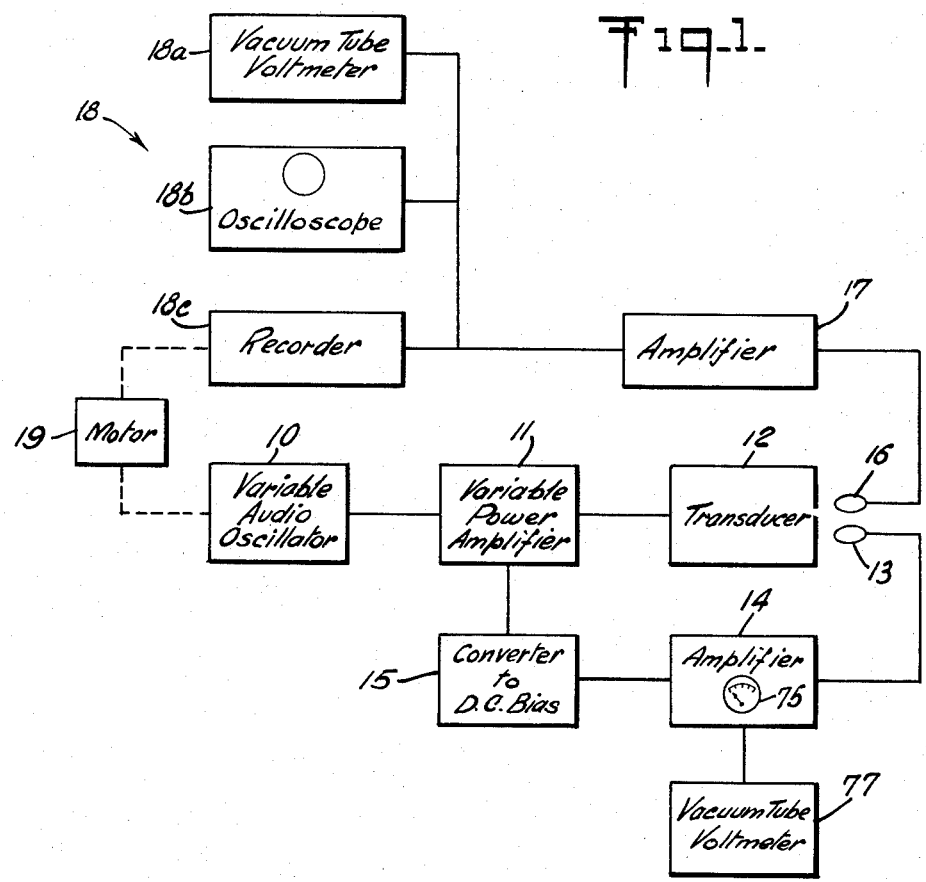

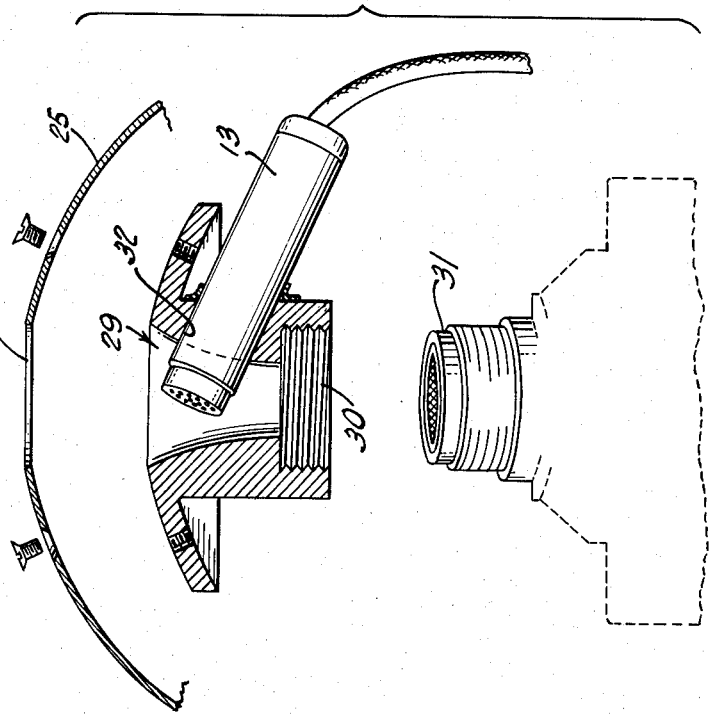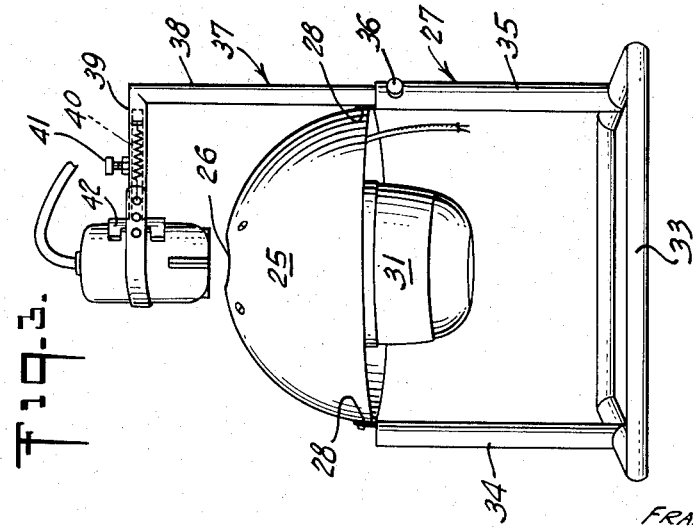

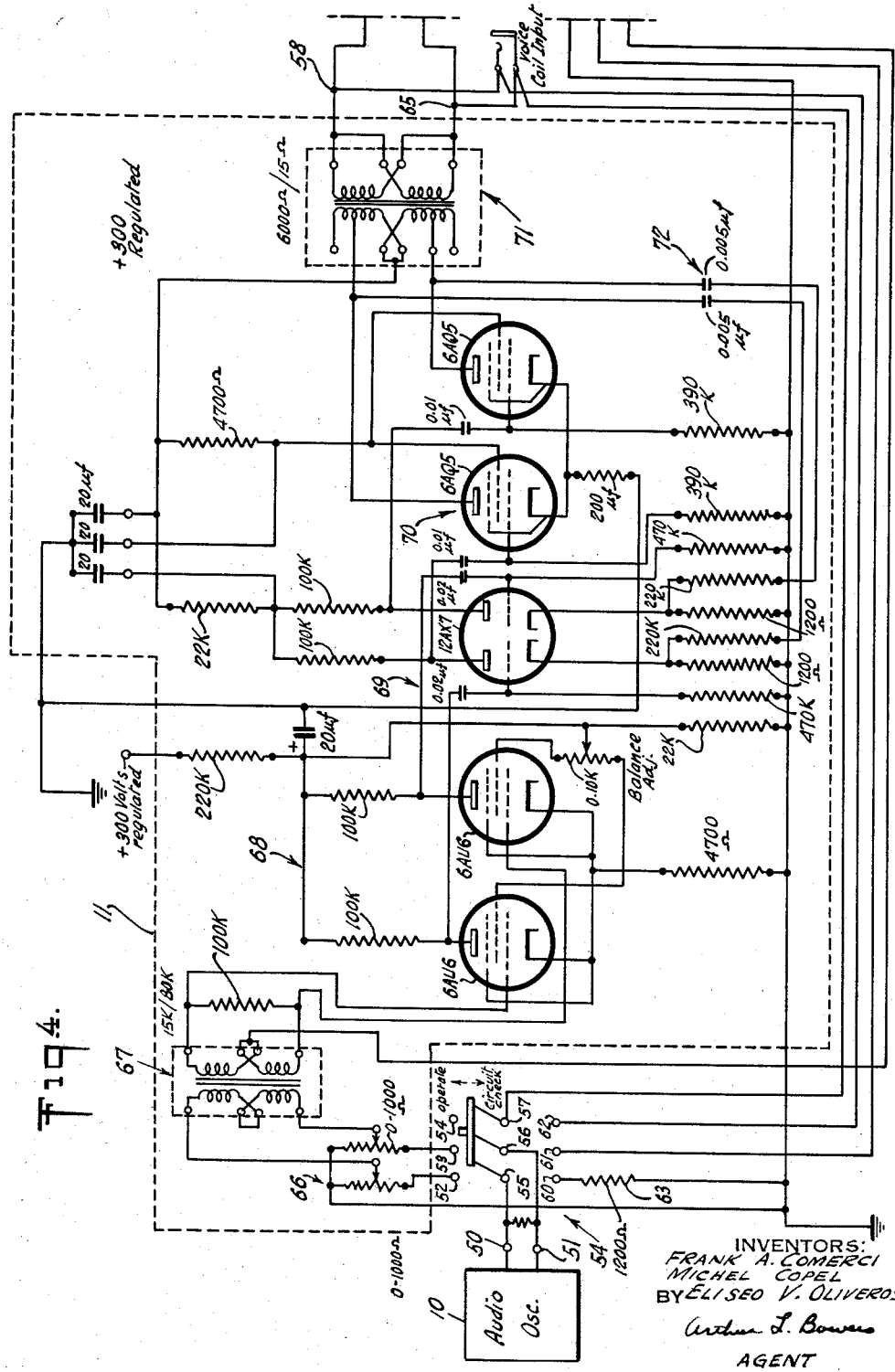

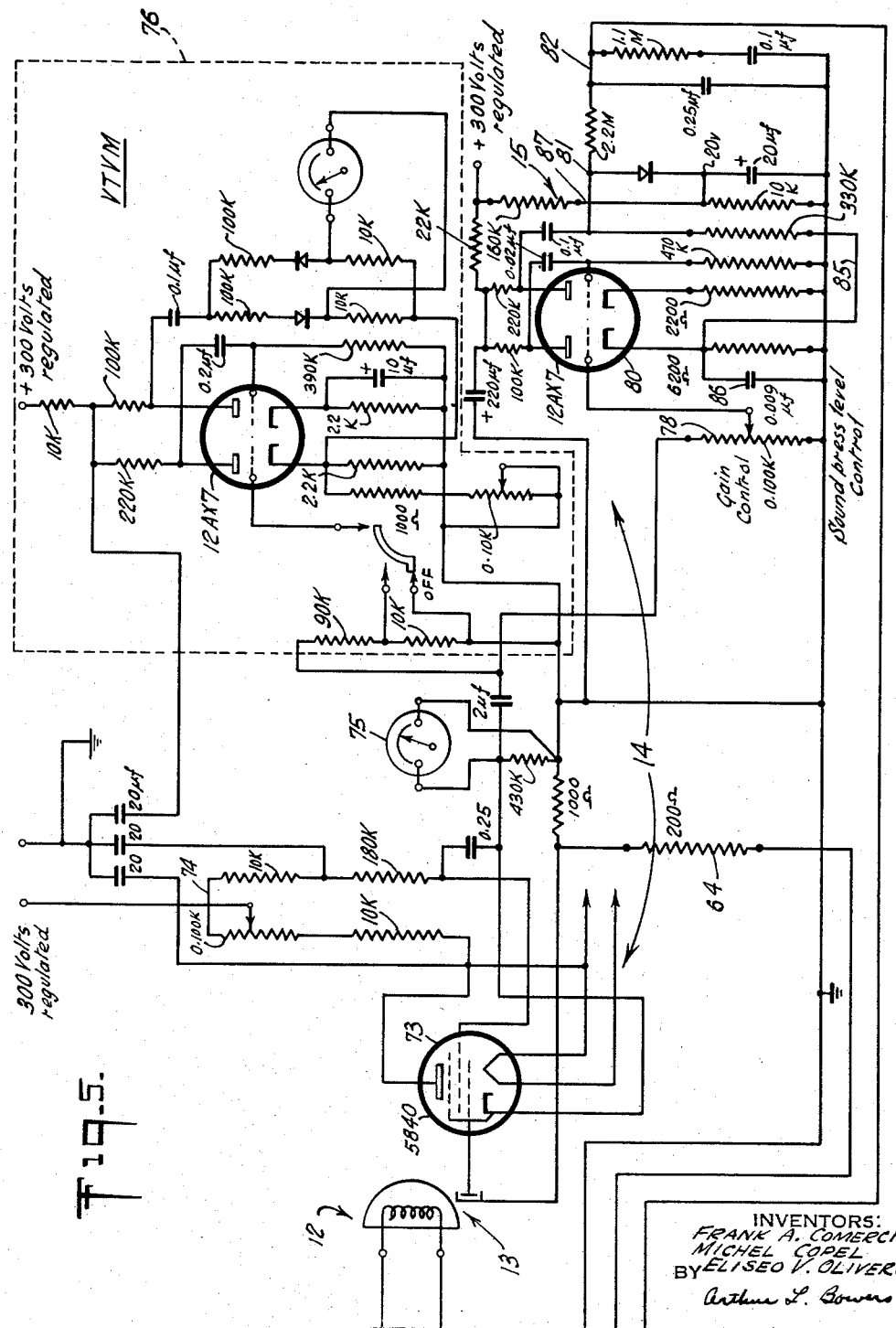

3,093,711
TESTING MICROPHONES
Frank A. Comerci, Stamford, Conn., and Michel Copel, Huntington Station, and Eliseo V. Oliveros, Forest Hills, N.Y., assignors to the United States of America as represented by the Secretary of the Navy
Filed Jan. 25, 1961, Ser. No. 84,963
2 Claims. (Cl. 179—175.1)
(Granted under Title 35, U.S. Code (1952), sec. 266)

The invention described herein may be manufactured and used by or for the Government of the United States of America for governmental purposes without the payment of any royalties thereon or therefor.

This invention relates to testing the performance characteristics of microphones, particularly close talking microphones.

An object of this invention is to obtain reliable data on microphone performance as a function of frequency, distance from sound source, orientation relative to the sound source, sound source intensity and other parameters.

A further object is to accurately test microphones while simulating sound pressure conditions existing around the mouth of a human being who is speaking.

A further object is to measure the output of a microphone as a function of frequency between selected frequency limits in the audio range and at substantially constant sound pressure irrespective of frequency, while in fixed spatial relationship to the sound source and in a selected orientation relative to the sound source and more particularly with the spatial sound pressure distribution around the microphone substantially similar to the spatial sound pressure distribution close to the mouth of a human being when speaking.

A further object is to provide apparatus for use in testing microphones and more particularly for producing spatial sound pressure distribution simulating that in the immediate vicinity of a human mouth when speaking.

A further object is to provide a sound source that can function as an artificial voice by substantially simulating spatial sound pressure distribution and frequency response characteristics of a human voice.

A further object is to improve frequency response measurements on close talking microphones and telephones.

Other objects and many of the attendant advantages of this invention will be readily appreciated as the same becomes better understood by reference to the following detailed description when considered in connection with the accompanying drawings wherein:

FIG. 1 is a block diagram broadly illustrating an aspect of the invention,

FIG. 2 is an exploded view of a sound source and sound monitor for use in the circuit of FIG. 1, FIG. 3 is an assembled view of the equipment shown in FIG. 2, and FIGS. 4 and 5 are adjacent portions of a schematic circuit diagram embodiment of a portion of the block diagram of FIG. 1.

In one of its aspects, the invention contemplates emitting, from a selected position, sound wave energy in the audio frequency range, and continuously monitoring the sound wave energy at a sensing position relative to the sound emitting source, and controlling the sound emitting source to maintain constant the sound pressure at a test position. The apparatus shown in FIG. 1 performs this function. It includes a signal source in the form of a variable audio oscillator 10 for producing sinusoidal audio frequency energy selectively between desired frequency limits within the audio range and at selected output voltage levels. The sinusoidal energy from the oscillator 10 is coupled into a variable or gain adjustable power amplifier 11 for driving an electroacoustic transducer 12 which converts the sinusoidal electrical energy into substantially sinusoidal acoustic or sound wave energy at the oscillator output frequency. The combination of elements 10, 11 and 12 is capable of being controlled to produce sinusoidal sound wave energy of a selected constant sound pressure at a selected test position relative to the emitting area of transducer 12 over the audio frequency range of interest. The audio range of interest for close talking microphones extends from about 200 cycles to over 6000 cycles. A monitor microphone 13 for sensing sound pressure is disposed in a selected monitor position relative to the emitting area of the transducer 12. The output of the monitor microphone 13 is coupled to an amplifier 14 and the amplified output therefrom is coupled to a converter 15 for changing the amplified output to a direct current level for use as a feedback bias voltage in the power amplifier 11 to oppose change in signal strength obtained from the output of amplifier 14. The monitor microphone 13, amplifier 14, and converter 15 are operable to control the combination of elements 10, 11 and 12 to produce sinusoidal wave energy of the selected constant sound pressure at the selected test position relative to the emitting area of transducer 12. A microphone 16 to be tested also referred to hereinafter the test microphone is disposed at the previously mentioned selected test position in the sound field of transducer 12. The output from test microphone 16 is amplified by amplifier 17 and coupled to instrumentation 18 which includes meter 18a, oscilloscope 18b, recorder 18c. The recorder 18c is a standard or conventional commercial type sound level recorder. A motor 19 is connected to the oscillator 10 and recorder 18c for causing the oscillator to sweep across the selected frequency band and for moving standard sound pressure recording paper in the recorder 18c at a rate such that its frequency ordinate moves past the recorder pen in unison with the changing output frequency of the oscillator 10. The recorder 18c provides a direct indication of the microphone output as a function of frequency. The recorder 18c and motor 19 are disconnected when the equipment is used for point by point plotting.

If the monitor position and the test position are very close to one another compared to their spacing from the emitting area of the transducer 12, that is they are not located in the near field of the transducer 12, the sound pressures at the monitor and test positions may be substantially identical. However, where the monitor position and the test position are very close to the emitting area of the transducer 12, and their spacing is comparable to one or both of the spacings from the emitting area, and they are not symmetrically located with respect to the emitting area, the sound pressures at the two positions may be different and the difference may change significantly with frequency in the upper part of the selected audio frequency range; the difference in sound pressures, if any, is constant at low frequency (e.g., below about 2000 cycles in an embodiment that was constructed and successfully operated) but at higher frequency the difference increases progressively with increasing frequency. Therefore, with monitor and test positions selected and fixed for near field tests, amplifier 14 is designed for constant frequency response in that lower fraction of the audio frequency range in which the sound pressure attenuation between monitor and test positions is constant and it is designed for a changing gain characteristic at higher frequency to compensate for the increasing attenuation between the test position and the monitor position with increasing frequency. A frequency sensitive feedback circuit may be used for providing the desired compensatory gain characteristic.

The apparatus in FIG. 1 may be used for near field tests or for intermediate and far field tests. For intermediate or far field tests the monitor microphone 13 is supported as close to the microphone 16 to be tested as is possible and if the test is such that the microphone 16 to be tested is moved from position to position during the course of the test, the monitor microphone is moved with it. However, the orientation of the monitor microphone relative to the transducer 12 is not changed with change in position; e.g., regardless of position its sensing area is directed toward the same part of the emitting area of the sound source. Using this method, measurements can be taken of the output of the test microphone 16 for indicating the relationship of output of microphone 16 vs. frequency at a selected position relative to the source, or output vs. position at a selected frequency and a selected orientation toward the emitting area of the source or output vs. orientation at a selected frequency and position. Test measurements have demonstrated that outside the near field, if monitor and test microphones are contiguous, attenuation of sound pressure between them is negligible over the audio range, particularly along the sound emitting axis. In the course of each of the tests described above the monitor microphone and its circuit operates to maintain a substantially unchanged sound pressure at the location of the test microphone in the direction between transducer 12 and the microphone; the selection of the desired sound pressure is made by adjustment of the audio oscillator output or adjustment of the amplifier 11.

Another method of using the apparatus is to support the monitor microphone in a fixed position and with its sensing area as close to the center of the emitting area of transducer 12 as possible. This method is advantageous where the test microphone e.g., a telephone or transmitter microphone is tested for near field performance, i.e., simulating conditions when in actual use.

There is shown in FIGS. 2 and 3 an apparatus for use in apparatus in FIG. 1 for carrying out near field performance measurements and for simulating the spatial sound pressure and frequency response characteristics in the immediate vicinity of the human mouth during speech. A substantially hemispherical shell 25 of a rigid material and about eight inches diameter to approximate a median size adult face and having a central opening 26 of about one and one-half inches diameter to approximate a median size open adult mouth, is supported at opposed parts of its rim by a rigid support frame 27. Grommets 28 of a soft non-resilient material are interposed between the fasteners engaging portions of the frame and the hemispherical shell. A throat-like adapter 29 is secured to the concave side of the hemispherical shell in line with opening 26. The throat is flared, preferably exponentially, for obtaining the desired frequency characteristics in accordance with audio design principles in the design handbooks, e.g., Radiatron Designer's Handbook. The adapter includes an internally threaded extension 30 beyond the constricted end of the throat for mounting a transducer such as a commercially marketed electromagnetic driver 31 in line with the throat. The sound wave energy emitting area of the driver and the area of the constricted end of the throat are selected and/or designed to be substantially identical and the threaded extension 30 is designed to threadedly engage the end of the electromagnetic driver to enable the two areas to be secured in contiguous relationship. The adapter 29 is formed with a lateral passage 32 through its side wall for receiving the monitor microphone 13 so that the sensitive area of the microphone can be supported to occupy a central portion of the emitting area of the throat. The lateral passage 32 is formed at an acute angle to the axis of the throat to enable the sensing area of the microphone to be located across the mouth of the throat. One type of commercially marketed microphone that may be used with advantage for this purpose is a cylindrical shape condenser microphone often referred to as a lipstick microphone because of its cylindrical shape and relatively short length. The microphone is electrically insulated from the hemisphere; it may be secured in place by any suitable insulating material, for example, insulating tape. The sensing area which comprises one end face of the microphone cylinder is smaller than the mouth of the adapter. A condenser microphone is characterized by a flat frequency characteristic which may range from about 30 cycles to about 10,000 cycles. This type of cylindrical condenser microphone generally carries a preamplifier in the same casing because of the high impedance of the microphone. By locating the sensing area of the monitor microphone substantially at and across part of the mouth of the sound wave transmitter source, the sound field within the mouth is substantially isolated from the effects of objects such as microphones, positioned in front of the mouth opening. The pattern of sound pressure distribution around the outside of the mouth of the sound transmitter is substantially unaffected by the presence of the monitor microphone and the latter is operable in the circuit in FIG. 1 to maintain constant the sound pressure at a selected position immediately in front of the mouth to simulate the position of a telephone or transmitter microphone relative to the mouth of a speaker using the microphone, e.g., ¾ inch immediately in front of the mouth opening of the throat. Tests have demonstrated that this structural arrangement affords spatial sound pressure distribution over the audio frequency range substantially simulating that around the human mouth when speaking, best results are obtained in the near field, i.e., less than 6 inches from the emitting area and in the lower part of the audio range, approximately the range of the human speaking voice, and the distance up to six inches corresponds to the range of distance from the mouth in which microphones are normally positioned.

The frame 27 has a base 33 and a pair of rods 34 and 35 of equal length, at least one of which, 35, is tubular, secured to and extending normal to the plane of the base. The ends of the rods remote from the base are fastened to diametrically opposite edge portions of the hemispherical shell. An L-shaped rod 37 having a leg portion 38 and a base portion 39 has its leg 38 telescopically and rotatably supported in tubular rod 35 and may be secured in a selected position by a thumb screw 36 threaded through rod 35. Another rod 40 is telescopically assembled with the base 39 of the L-shaped rod 37 and made to be secured in a selected position by a thumb screw 41 threaded through the L-base 39. The rod 40 carries a nesting support 42 for a microphone. The adjustable elements of the frame which may include reference or calibration markings enable a microphone to be supported and tested in a variety of predetermined positions relative to the mouth of the sound transmitting throat. The illustrated size of the frame is suitable for near field measurements. For making measurements further away from the sound emitting area a larger frame than the one illustrated in FIG. 2 is used.

In the schematic circuit in FIGS. 4 and 5 there is connected between the output terminals 50 and 51 of the variable audio oscillator 10 and the input terminals 52 and 53 of the variable power amplifier 11 a triple-pole double-throw switch 54 for connecting the circuit in operate condition or alternatively for checking the circuit. Two poles 55 and 56 of the double-throw switch are connected to the terminals of the audio oscillator and the third pole 57 is connected to one of the output terminals 58 of the variable power amplifier 11. When the switch is in the operate position the audio oscillator terminals 50 and 51 are connected to the input terminals of the variable power amplifier 11. The remaining pole 57 of the switch which is connected to output terminal 58 of variable power amplifier 11 is connected to isolated terminal 59 leaving the output of amplifier 11 unaffected. The other three terminals 60, 61, 62 of switch 54 are connected respectively to a resistor 63 terminating at ground, the monitor microphone through resistor 64, and the other output terminal 65 of the variable power amplifier 11, respectively. When the switch is in circuit check position, the output terminals 58 and 65 of the variable power amplifier 11 are shorted and the audio oscillator terminals are connected in circuit with the monitor microphone. In this switch position, the operation of the monitor microphone and amplifier 14 may be checked by adjusting the audio oscillator to a selected output voltage, e.g., one volt and by checking the indicator in circuit with amplifier 14. The variable power amplifier 11 includes the following stages between its input and output terminals; an input level adjust potentiometer 66, a coupling transformer 67, and three push-pull amplifier stages 68, 69, 70 and an output transformer 71 and feedback loop 72 between the last amplifier stage 70 and the intermediate amplifier stage 69. The feedback loop 72 is operable to control distortion and maintain stability. The transducer 12 is connected to the output terminals of the variable power amplifier 11.

The amplifier 14 includes a cathode follower preamplifier stage 73 wherein the heater is substantially more positive than the cathode to preclude electron movement from heater to cathode to eliminate possible tube noise due to this condition. A potentiometer 74 is operable to adjust the plate current for adjusting the operating point and without changing the gain. A meter 75 is connected across the cathode resistor 76 of the preamplifier and preferably is calibrated in volts for use when the switch 54 is in circuit checking position to indicate whether the monitor microphone and amplifier 14 are operating properly. A vacuum tube voltmeter 77 also is connected across the cathode resistor 76 and is calibrated to register the sound pressure at the monitor microphone. The output of the preamplifier 73 which preferably is an integral part of the monitor is coupled into a two stage amplifier 80 through a gain control potentiometer 78. Part of the output of the second stage is fed back through feedback circuit 85 to the cathode of the first stage. The cathode resistor of the first stage is shunted by a capacitor 86 which in the disclosed embodiment is designed to attenuate the feedback at frequencies above about 2000 cycles and has an increasing attenuation effect with increasing frequency. As a result, the amplifier 14 has a rising gain characteristic starting at about 2000 cycles which serves to compensate for changing attenuation with frequency between the monitor and test positions in the near field tests using the equipment shown in FIG. 3. The amplifier 14 is designed for the necessary compensation after measurements are obtained of the actual sound pressure attenuation between the selected monitor and test positions in the near field in the selected frequency range. If more than one combination of monitor and test positions are contemplated, a compensatory feedback circuit is provided for each condition in amplifier 80 and a selector switch is provided for choosing among them. These additional resistors, capacitors, and selector switch are not shown for the sake of clarity.

A limiting circuit 81 is connected to the output of amplifier 80 and is operable to clip that part of each positive half cycle exceeding a reference voltage provided by voltage divider 87. An averaging circuit 82 is connected to the limiter for converting the limited signal to its average unidirectional voltage level, which is of negative polarity, and the latter is coupled back by lead 83 to the input of push pull amplifier stage 68 to maintain constant the sound pressure at the test position. The test microphone and its circuit are not shown in the circuit diagram.

Obviously many modifications and variations of the present invention are possible in the light of the above teachings. It is therefore to be understood that within the scope of the appended claims the invention may be practiced otherwise than as specifically described.

We claim:
1. An apparatus for use in testing a close talking microphone comprising a source of swept audio frequency sinusoidal power of controllable amplitude, an element energizable by said source for radiating into the atmosphere swept-frequency substantially sinusoidal acoustic wave energy in a spatial sound distribution in the immediate vicinity thereof simulating that in the immediate vicinity of a human mouth when speaking, said radiating element including a substantially hemispherical dish-shaped member having a central opening through the wall thereof for passing said acoustic wave energy, acoustic sensing means having substantially linear response in the audio band for continuously monitoring the amplitude of the acoustic wave energy at a position contiguous with the opening in said hemispherical member and in the direct radiation field of said element, means coupled to said acoustic sensing means and to said source of power to maintain the amplitude of the acoustic wave energy at said position substantially constant over said frequency band, and means for supporting a close-talking microphone to be tested proximate to the convex side of said hemisphere and approximately in line with said opening to approximate use by a human being.

2. An apparatus as defined in claim 1 having a throat element secured to the concave side of said hemisphere in line with said opening.

References Cited in the file of this patent
UNITED STATES PATENTS

| | | |
|---|---|---|
| 1,565,177 | Mackenzie | Dec. 8, 1925 |
| 2,107,757 | Kingsley | Feb. 8, 1938 |
| 2,224,909 | Hackley | Dec. 17, 1940 |
| 2,805,289 | Buijs | Sept 3, 1957 |
| 2,873,361 | Pepperberg | Feb. 10, 1959 |

FOREIGN PATENTS

| | | |
|---|---|---|
| 813,169 | Germany | Sept. 10, 1951 |

OTHER REFERENCES

Acoustic Measurements, Beranek, April 1949; p. 402, Figs 9–22, pp. 717–719.

Acoustical Engineering, Olson, Fig. 10.5, p. 434, TK5981 O5, 1957 C.2.

The Journal of the Acoustical Society of America, Sacerdote, vol. 31, No. 2, February 1959; pp. 133–136.